Figure 1:
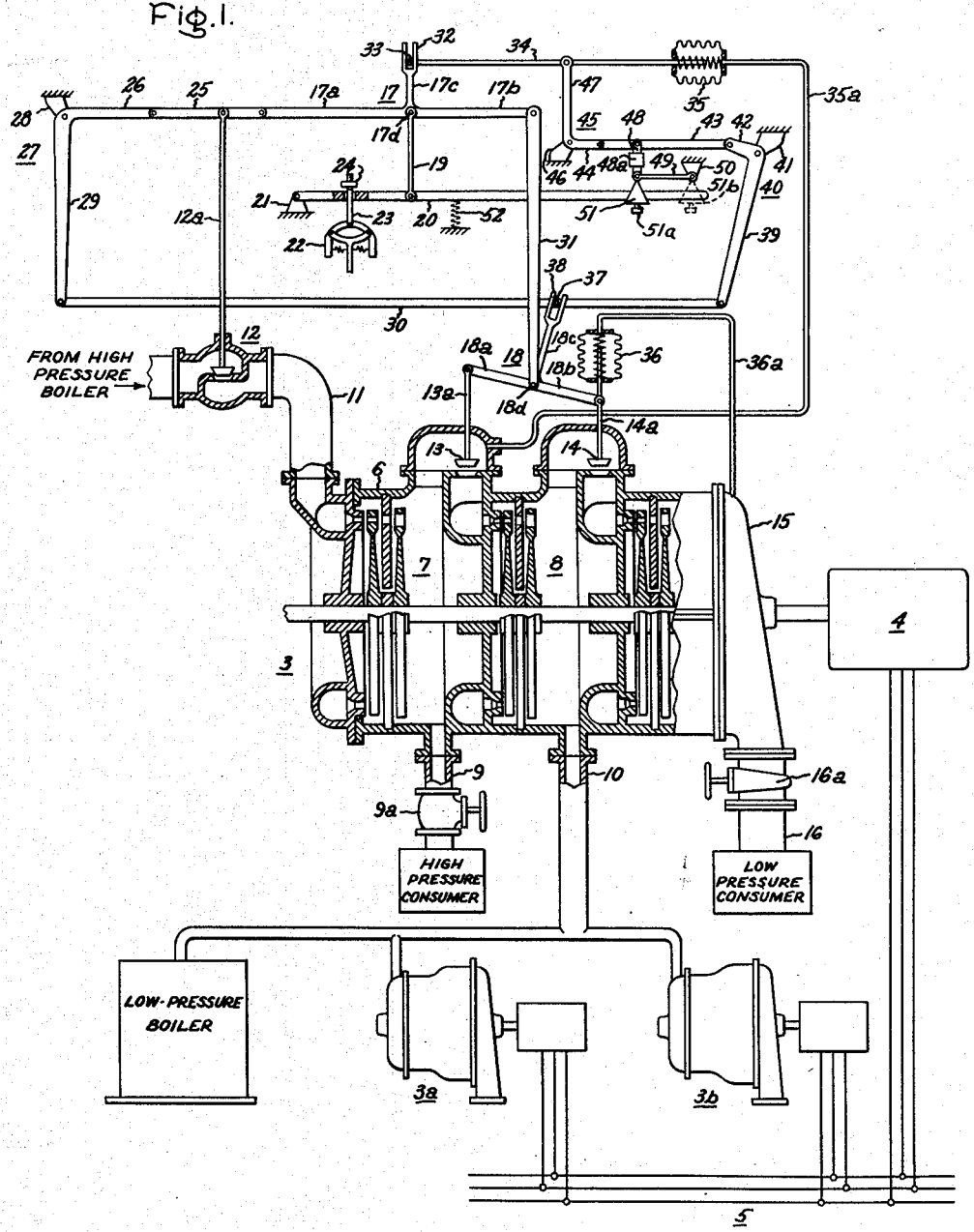

Sept. 19, 1950  L. B. WALES  2,523,078
GOVERNING MECHANISM FOR MULTISTAGE
ELASTIC FLUID TURBINES
Filed March 22, 1947  2 Sheets-Sheet 2

Inventor:
Lawrence B. Wales,
by Parcell S. Mack
His Attorney.

Patented Sept. 19, 1950

2,523,078

UNITED STATES PATENT OFFICE 2,523,078

GOVERNING MECHANISM FOR MULTI-STAGE ELASTIC FLUID TURBINES

Lawrence B. Wales, Marblehead, Mass., assignor to General Electric Company, a corporation of New York Application March 22, 1947, Serial No. 736,521

6 Claims. (Cl. 60—67)

This invention relates to an improved governing mechanism for multi-stage elastic fluid turbines from which elastic fluid at different pressures is extracted or to which elastic fluid at different pressures is conducted at several intermediate stages. When elastic fluid is extracted from intermediate stages, a turbine of this type is said to be a "multi-extraction turbine"; and when elastic fluid from an external source is conducted to one or more intermediate stages, it is referred to as a "mixed-pressure turbine." If fluid is extracted at certain intermediate stages and supplied to others, it may be known as a "multi-mixed pressure turbine."

The elastic fluid extracted from a multi-extraction turbine may be utilized as an operating medium for lower pressure turbines in a power plant system, or for industrial processing or other heating purposes. In order to obtain the maximum overall efficiency of a steam generating and consuming plant including a turbine of the multi-extraction or multi-mixed pressure type, it is sometimes desired to maintain constant the flow of elastic fluid to the turbine, without regard to the load output of the turbine or to the fluid extraction demands. The present invention provides a governing mechanism capable of effectively meeting this requirement.

When operating a multi-extraction or multi-mixed pressure turbine under certain other operating conditions, it may be preferred to maintain constant the output of the turbine and also the pressures in those stages from which elastic fluid is extracted or to which elastic fluid from an outside source is conducted. A governing mechanism for performing this function is disclosed in United States Patent 2,111,420, issued March 15, 1938, upon an application of Franklin R. Ericson and Edgar D. Dickinson and assigned to the same assignee as the present application. A governor constructed in accordance with the present invention is also capable of performing the functions of the Ericson-Dickinson extraction turbine governor.

Accordingly, an object of my invention is to provide improved governing means for multi-stage elastic fluid turbines of the multi-extraction and multi-mixed pressure types.

Another object is to provide an improved governor for elastic fluid turbines of the type described which is effective to maintain constant the turbine inlet throttle flow during changing load conditions and varying steam extraction demands.

A further object is to provide an improved elastic fluid turbine governing arrangement of the type described with readily adjustable means whereby it is also capable of effecting operation with constant load and constant extraction pressures.

Figure 2:
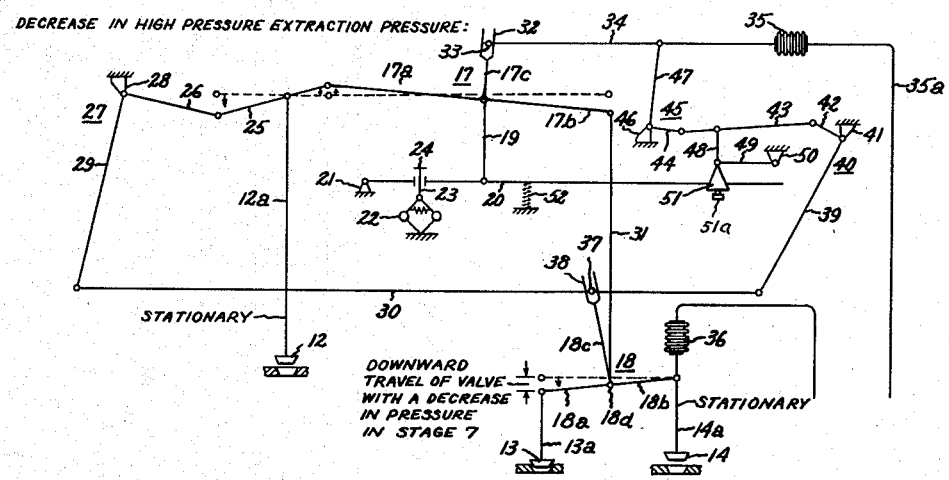
Figure 3:
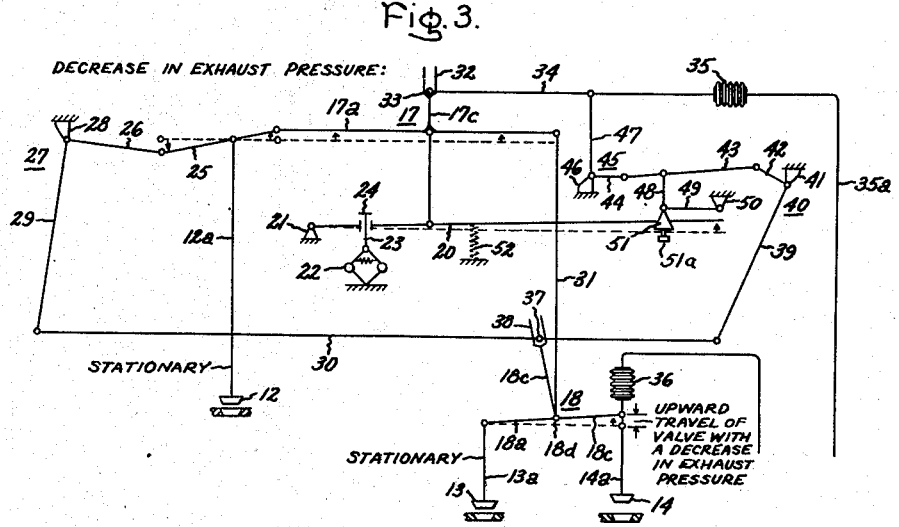

Other objects and advantages will be apparent from the following description taken in connection with the accompanying drawings in which Fig. 1 illustrates a multi-extraction turbine arrangement, partly in section, and a governing mechanism in accordance with the invention; and Figs. 2 and 3 are diagrammatic representations of the governing mechanism showing the positions of the parts for decreasing pressures in the high pressure extraction stage and the turbine exhaust respectively.

Referring now to Fig. 1, the turbo-generator shown comprises a multi-extraction elastic fluid turbine 3 directly coupled to a generator 4 furnishing electrical energy to a three-phase "load line" 5. Other turbo-generators 3a, 3b are connected in parallel with generator 4 to load line 5.

The multi-extraction turbine 3 comprises a casing 6 defining two intermediate stages 7, 8 in series flow relation, from which elastic fluid is extracted through conduits 9, 10 respectively. Conduit 9 contains a valve 9a for regulating the flow of fluid from intermediate stage 7 to a high pressure consumer. Elastic fluid from a high pressure boiler (not shown) is supplied to turbine 3 through an inlet conduit 11 containing a throttle valve 12 for controlling the flow of fluid therethrough. The flow of elastic fluid from the intermediate stages to succeeding stages is controlled by the interstage valves 13, 14. Secured to casing 6 is an exhaust hood 15 from which exhaust fluid flows through conduit 16, containing a valve 16a. The high pressure extraction fluid from intermediate stage 7 and the turbine exhaust fluid may be utilized for heating or various other industrial processing purposes as represented in Fig. 1, while the low pressure extraction fluid from intermediate stage 8 serves as "topping" motive fluid for the lower fluid pressure turbo-generator units 3a, 3b.

My governing mechanism is intended primarily to control the inlet valve 12 and the interstage valves 13, 14 so as to maintain constant the inlet flow through conduit 11 in response to varying demands for extraction steam through conduits 9, 16. In effect then, the low pressure extraction stage 8 serves as a "sump" or exhaust for that part of the total fluid flow through throttle valve 12 which is not required by the extraction demands in conduits 9, 16; and what is ordinarily termed the "exhaust" is in effect a low pressure extraction stage. Thus, if the governing system is set to maintain a constant inlet flow such as 200,000 pounds per hour, and if the high pressure and exhaust extraction flow demands are 100,000 and 50,000 pounds per hour respectively, the remainder or 50,000 pounds per hour is available for extraction from stage 8. If then the extraction demands from conduits 9, 16 increase or decrease, the governing mechanism automatically adjusts the interstage valves 13, 14 so that the flow through conduit 10 will decrease or increase by a like amount.

More particularly, the governing mechanism includes two floating "three-arm levers" 17, 18, each having three arms integrally united or securely fastened together to form a "common point." The first three-arm lever 17 comprising arms 17a, 17b and 17c has a floating "common point" 17d pivotally connected by a link 19 to a lever 20, the left-hand end of which is pivoted to a fixed fulcrum 21. A load responsive device, represented here as a centrifugal speed governor 22, includes a vertical stem 23 having an adjustable nut 24. Stem 23 is slidably arranged through an opening in lever 20 so that the shoulder formed by nut 24 will move downwardly to engage lever 20 at a predetermined speed.

The left-hand arm 17a of lever 17 is pivoted to the right-hand end of a floating lever 25, to an intermediate point of which is connected stem 12a of throttle valve 12. The left-hand end of floating lever 25 is pivoted to the horizontal arm 26 of a bell-crank lever 27 supported on fulcrum 28. The other arm 29 of bell-crank 27 is pivoted to the left-hand end of a rod 30. The upright arm 17c of lever 17 forms a forked yoke 32 engaging a pin 33 in the stem 34 of a pressure responsive bellows 35, which latter is connected by a conduit 35a to extraction stage 7 so as to be responsive to changes in pressure therein. The right-hand arm 17b of lever 17 is connected by a link 31 to the "common point" 18d of the second three-arm lever 18.

Three-arm lever 18 has a left-hand arm 18a connected to the stem 13a of valve 13, while the right-hand arm 18b is connected to the stem 14a which connects valve 14 to a second pressure-responsive bellows 36, the latter being connected by a conduit 36a to exhaust hood 15.

With this arrangement, valve 14 is directly positioned by bellows 36 in response to changes in the turbine exhaust pressure. The turning motion of the three-arm lever 18 causes lateral movement of rod 30, which has a pin 37 engaging a forked yoke 38 formed by the vertical arm 18c of lever 18. The right-hand end of lever 30 is pivotally connected to the vertical arm 39 of a second bell-crank lever 40 supported by fulcrum 41. The horizontal arm 42 of bell-crank lever 40 is pivoted to the right-hand end of a floating lever 43. The left-hand end of the latter is pivotally connected to the horizontal arm 44 of a third bell-crank lever 45 which is supported on a fulcrum 46 and has an upright arm 47 pivoted to stem 34 of the pressure responsive device 35. The lateral movement of stem 34 thereby positions bell-crank lever 45. A link 48, the length of which is adjustable by rotating nut 48a, connects an intermediate point of lever 43 with another link 49, the right-hand end of which pivots on a fulcrum 50.

The method of operation of the governing mechanism is selected by an adjustable "pick-up" or abutment 51 which is slidably arranged on lever 20 and locked in desired position by a set-screw 51a. Lever 20 is biased upwardly by coil spring 52 so the abutment 51 engages the lower end of link 48, when in the solid line position shown in Fig. 1, or it may engage fulcrum 50 when in the alternate dotted line position 51b. When pick-up 51 is positioned to engage link 48, the governing mechanism may be said to operate "constant inlet flow"; and when positioned to engage fulcrum 50, as indicated by the dotted lines in Fig. 1, the governor may be said to operate "constant load." When pick-up 51 is positioned at some intermediate point between the "constant load" and "constant inlet flow" positions shown in Fig. 1, the governing mechanism operates to vary both the load and inlet flow, the degree of variation of each being dependent on the relative position of the pick-up. The length of link 48 determines the amount of the clearance or gap between the abutment 24 of speed governor spindle 23 and lever 20, and hence determines the turbine speed or load at which the speed governor 22 will become effective to close valve 12.

During operation of an ordinary turbo-generator, the speed will vary in accordance with changes in the demand for electrical output. However, when a governing mechanism according to my invention is employed to maintain constant the inlet steam flow to the turbine (with pick-up 51 in engagement with link 48) the frequency of the electrical load output and hence the speed of turbine 3 will be held at a preselected normal rated value by the electrical interconnection with other parallel turbo-generators in the system, represented by units 3a, 3b. This characteristic of such electrical machines is well known and understood by those familiar with the art, and the electrical reasons for the phenomenon are not necessary to an understanding of the present invention.

By properly adjusting the nut 24 the speed governor 22 may be set to start closing the turbine inlet valve 12 should the speed, for some reason extraneous to turbine 3, rise a predetermined amount, for instance to 102% of the normal rated speed. Assuming that such an overspeed condition occurs, the action of speed governor 22 will cause downward movement of lever 20, link 19 and three-arm lever 17. The downward movement of lever 17 will cause clockwise turning movement of lever 25 about its left-hand end, whereby valve stem 12a of inlet valve 12 moves towards the closed position, effecting a reduction in flow of elastic fluid into the turbine. At the same time, the downward movement of lever 17 effects downward movement of link 31 which will cause lever 18 to rotate counterclockwise about the extreme right-hand pivot of arm 18b, thereby moving stem 13a of valve 13 towards the closed position. If then, the speed still rises, valve 13 will close completely and since the downward force of speed governor 22 is sufficient to overcome the spring force of bellows 36 (which tends to hold stem 14a stationary) further downward movement of link 31 will cause lever 18 to rotate clockwise about the extreme left-hand pivot of arm 18a, thereby moving stem 14a of valve 14 towards the closed position so that steam entering through conduit 10 cannot flow through the final stages of turbine 3 into exhaust casing 15. The mechanism may be properly designed and adjusted so that all valves 12, 13 and 14 will be completely closed at a predetermined speed such as 107% of the normal rated speed.

In the operation of a turbine of the type described, a change in pressure in either the high pressure extraction conduit 9 or in the conduit 16 may occur, due to a change in the demand for extraction steam through these conduits, which demand may be considered as being determined by opening and closing valves 9a, 16a.

If the demand for extraction fluid from conduit 9 increases (Fig. 2), the accompanying decrease in fluid pressure in stage 7 will be transmitted through conduit 35a to the pressure responsive bellows 35, causing the bellows to contract and stem 34 to move to the right. The movement to the right of stem 34 effects the simultaneous clockwise turning of lever 17 and bell-crank lever 45. The clockwise turning of bell-crank lever 45 moves the left-hand end of lever 43 downwardly so that link 48, in engagement with pick-up 51, depresses lever 20 causing a downward movement of link 19 and three-arm lever 17. The combined clockwise turning and downward movement of three-arm lever 17 moves link 31 downwardly and also raises the right-hand end of floating lever 25. Downward movement of link 31 effects counterclockwise turning of lever 18 about the right-hand pivot of arm 18b. Simultaneously the counterclockwise turning of three-arm lever 18 moves lever 30 towards the left whereby bell-crank lever 40 turns in a clockwise direction about fulcrum 41. The clockwise turning of bell-crank lever 40 raises the right hand end of lever 43, which counteracts to some extent but not completely, the depression of the left-hand end caused by the initial clockwise turning of bell-crank lever 45. Stem 14a of valve 14, being positioned directly by bellows 36, remains stationary since no change in exhaust pressure has yet occurred. Counterclockwise turning of three-arm lever 18 moves stem 13a of valve 13 a proportionate distance towards the closing position to satisfy the increase in demand for extraction fluid from stage 7 through conduit 9. The abovementioned movement of lever 30 towards the left also turns bell-crank lever 27 in a clockwise direction about fulcrum 28. This clockwise turning of bell-crank lever 27 depresses the left-hand end of floating lever 25 to compensate for the upward movement of the right-hand end, with the result that the junction point of stem 12a and floating lever 25 remains fixed. In effect, floating lever 25 pivots in space about its intermediate pivot point with stem 12a so that inlet valve 12 remains undisturbed, and therefore the flow of high pressure operating fluid into turbine 3 through conduit 11 remains constant.

Thus with an increase in demand for extraction steam from stage 7 (i. e. a decrease in first extraction stage pressure), inlet valve 12 and interstage valve 14 remain substantially stationary, thereby effecting constant inlet flow through conduit 11 and constant extraction flow through conduit 16. Only valve 13 moves to increase the extraction flow from stage 7, while the extraction flow from stage 8 through conduit 10 is decreased by a like amount.

If the demand for exhaust steam through conduit 16 increases (Fig. 3), the accompanying drop in the exhaust pressure is transmitted through conduit 36a to the pressure responsive bellows 36 causing the bellows to contract and stem 14a of valve 14 to move upwardly. The degree of upward movement of valve 14 is of course proportional to the drop in exhaust pressure so that the flow of elastic fluid which passes through the last stage of turbine 3 to conduit 16 is increased, thereby meeting the required increase in demand. The several component parts of the lever system are co-related in a manner such that when stem 14a moves upwardly upon a decrease in pressure in casing 15, stem 13a of valve 13 remains stationary, maintaining a constant extraction flow from stage 7. This upward movement of stem 14a will produce counterclockwise turning of the three-arm lever 18 about its common point, which initially tends to move stem 13a downwardly towards the closing position. However, the counterclockwise turning of three-arm lever 18 also moves lever 30 towards the left whereby the bell-crank lever 40 pivots clockwise about fulcrum 41 thus elevating the right-hand end of floating lever 43. Link 48 then moves upwardly permitting the upward movement of the spring biased lever 20. The upward movement of lever 20 is transmitted by link 19 to three-arm lever 17 which moves vertically upward without rotation, and raises link 31. The "follow-up" movement of link 31 is related to the upward movement of stem 14a in such a way that the combined effects of rotation and translation of three-arm lever 18 compensate to maintain stem 13a stationary. Thus valve 13 is held stationary regardless of changes in exhaust pressure, and the flow through conduit 9 therefore remains constant.

Meanwhile the above-described translational upward movement of three-arm lever 17 raises the right-hand end of lever 25 which tends to move stem 12a of inlet valve 12 towards the open position. Here again, however, the aforementioned movement to the left of lever 30 turns the bell-crank lever 27 clockwise, thereby lowering the left-hand end of lever 25. This lowering of the left-hand end of lever 25 counters the upward movement of the right-hand end so that stem 12a remains substantially stationary and therefore the flow of elastic fluid through throttle valve 12 remains constant.

Thus with an increase in demand for extraction steam through conduit 16, inlet valve 12 and interstage valve 13 remain substantially stationary and only valve 14 moves to permit the required increase in fluid flow to the turbine exhaust. Since inlet valve 12 and interstage valve 13 remain substantially stationary, the inlet flow of elastic fluid to turbine 3 and the high pressure extraction flow from stage 7 will remain constant. Therefore the low pressure extraction flow through conduit 10 from stage 8 will decrease by an amount equal to the increase in exhaust flow.

A decrease in demand for either high pressure extraction fluid through conduit 9 or extraction fluid from conduit 16 will effect operation of the governing mechanism which is the reverse of the operation described above for increased demands from these stages.

It may be noted that the electrical load output of generator 4 varies in accordance with the demand for extraction steam from conduits 9 and 16. If the demand for extraction fluid from conduit 9 increases, less of the total inlet steam flow through conduit 11 will be available for electrical output and therefore a decrease in electrical output corresponding to the increase in extraction flow will occur. If, on the other hand, the demand for extraction fluid from conduit 16 increases, a greater portion of the total inlet flow will traverse the turbine 3 and the electrical load output will increase proportionally.

To summarize, a governing mechanism in accordance with my invention is primarily intended to operate so as to maintain constant the inlet flow of elastic fluid to a turbine upon a change in demand for steam from the high pressure extraction stage 7, a change in demand for extraction steam from conduit 16 or any combination of these conditions. In addition, the governing mechanism may be readily adjusted to operate "constant load" (with pick-up 51 positioned to engage fulcrum 50), in which case the inlet flow varies, as with the governing mechanism of United States Patent 2,111,420—Erickson et al.

While a particular embodiment of the invention has been illustrated and described, it will be obvious to those familiar with the art that various changes and modifications may be made without departing from the invention, and it is intended to cover in the appended claims all such changes and modifications as come within the true spirit and scope of the invention.

What I claim as new and desire to secure by Letters Patent of the United States, is:

1. Control mechanism for a multi-stage elastic fluid turbine having an inlet valve, a first high pressure stage, a second medium pressure stage, and a third low pressure stage, first, second and third conduit means connected to the first, second and third pressure stages respectively, second valve means for regulating flow from the first pressure stage to subsequent stages, third valve means for regulating flow from the second pressure stage to subsequent stages, and extraneous means for normally holding turbine speed constant, said control mechanism comprising first and second floating lever means arranged for translatory and rotational movement, a third floating lever connected at one end to said first lever and having an intermediate portion connected to the inlet valve, means connecting spaced parts of the second floating lever to the second and third valves respectively, means connecting an intermediate portion of the second lever to a part of the first floating lever spaced from the connection to the third lever, governor means responsive to turbine speed, means connecting the speed governor to an intermediate portion of the first lever to effect translation thereof and position the first, second and third valves, said last-mentioned connecting means including a fourth pivoted lever and a lost motion connection between the governor and fourth lever whereby the governor becomes effective to position the valves upon a preselected increase in speed above the normal value maintained by said extraneous means, means responsive to pressure changes in the first conduit for effecting rotation of the first lever to position the second valve, means responsive to pressure changes in the third conduit for effecting rotation of the second lever to position the third valve, first restoring linkage means connecting the second lever to the third lever whereby the first valve is held stationary regardless of changes in position of the second valve, and second restoring linkage means connecting the second lever with the fourth lever to effect a compensating movement of the first lever whereby the first and second valves are held stationary regardless of changes in position of the third valve.

2. Control mechanism for a multi-stage elastic fluid turbine having an inlet valve, a first high pressure stage, a second medium pressure stage, and a third low pressure stage, first, second and third conduit means connected to the first, second and third pressure stages respectively, second valve means for regulating flow from the high pressure stage to subsequent stages, third valve means for regulating flow from the medium pressure extraction stage to subsequent stages, said control mechanism comprising, first and second floating lever means arranged for translatory and rotational movement, a third floating lever connected at one end to said first lever and having an intermediate portion connected to the inlet valve, means responsive to first stage pressure for effecting rotation of the first lever to position the second valve, means responsive to third stage pressure for effecting rotation of the second lever to position the third valve, first restoring linkage means connecting the second lever to another end of the third lever, and second linkage means connecting the second lever with the first lever to effect compensating motion of the third lever whereby the first valve is held stationary regardless of changes in position of the second and third valves.

3. The combination with a multi-stage elastic fluid turbine having an inlet valve, initial and final extraction stages and an exhaust stage, interstage valve means for controlling elastic fluid flow from the extraction stages, and extraction conduit means connected to said extraction stages, of a regulating mechanism comprising first and second floating lever means, first means responsive to pressure changes in the initial extraction stage adapted to position said first floating lever means, second means responsive to pressure changes in the final extraction stage adapted to position said second floating lever means, first linkage means interconnecting the second floating lever means with the inlet valve, second linkage means interconnecting the second floating lever means with the first floating lever means and adapted to effect translatory movement thereof, third linkage means connecting the first pressure responsive means with the second linkage means, and first restoring linkage means connecting the first and second lever means whereby a pressure change in any given extraction stage causes the regulating mechanism to position the interstage valve directly controlling fluid flow from that extraction stage while holding the inlet valve and the other interstage valve stationary.

4. The combination with a multi-stage elastic fluid turbine having an inlet valve, initial and final extraction stages and an exhaust stage, interstage valve means for controlling elastic fluid flow from the extraction stages, and extraction conduit means connected to said extraction stages, of a regulating mechanism comprising first and second floating lever means having first, second and third spaced portions respectively, the first and second spaced portions of said second floating lever means being connected to the interstage valve means, first and second means responsive to pressure changes in the initial and final extraction stages respectively, first means connecting the first pressure responsive means with the first portion of the first lever, means connecting the second pressure responsive means with the first portion of the second lever, third floating lever means having an intermediate portion connected to the inlet valve, means connecting an end portion of the third floating lever with the second portion of the first floating lever, first linkage means connecting an opposite end portion of the third lever with the third portion of the second lever, second linkage means connecting the third portion of the second lever with an intermediate portion of the first lever, third linkage means connecting the first connecting means with the second linkage means, and restoring linkage means connecting the third portion of the first lever with an intermediate portion of the second lever whereby said interstage valves are positioned to maintain at preselected values the pressures in said initial and final extraction stages while the position of the inlet valve remains substantially constant.

5. The combination with a multi-stage elastic fluid turbine having an inlet valve, initial and final extraction stages and an exhaust stage, interstage valve means for controlling elastic fluid flow from the extraction stages, and extraction conduit means connected to said extraction stages, of a regulating mechanism comprising first and second floating lever means having first, second and third extreme portions respectively, the first and second extreme portions of said second floating lever means being connected to the interstage valve means, first and second means responsive to pressure changes in the initial and final extraction stages respectively, first means connecting the first pressure responsive means with the first extreme portion of the first lever, means connecting the second pressure responsive means with the first extreme portion of the second lever, third floating lever means having an intermediate portion connected to the inlet valve, means connecting an end portion of the third floating lever with the second extreme portion of the first floating lever, first linkage means connecting an opposite end portion of the third lever with the third extreme portion of the second lever, second linkage means connecting the third extreme portion of the second lever with an intermediate portion of the first lever, third linkage means connecting the first connecting means with the second linkage means, and restoring linkage means connecting the third extreme portion of the first lever with an intermediate portion of the second lever whereby the regulating mechanism maintains the inlet valve substantially stationary and means modifying the action of the second and third linkage means whereby the regulating mechanism maintains the turbine load output substantially constant.

6. Control mechanism for a multi-stage elastic fluid turbine having an inlet valve, a first high pressure stage, a second medium pressure stage and a third low pressure stage, first, second and third conduit means connected to the first, second and third pressure stages respectively, second valve means for regulating flow from the first pressure stage to subsequent stages, third valve means for regulating flow from the second pressure stage to the third pressure stage, and extraneous means for normally holding turbine speed constant, said control mechanism comprising first and second floating lever means arranged for translatory and rotational movement and each having first, second and third spaced portions, the first and second spaced portions of said second floating lever means being connected to the third and second valve means respectively, first and second means responsive to pressure changes in the first and third conduits respectively, first means connecting the first pressure responsive means with the first portion of the first lever for effecting rotation thereof, means connecting the second pressure responsive means with the first portion of the second lever for effecting rotation thereof, a third floating lever connected at one end to the second portion of the first lever and having an intermediate portion connected to the inlet valve, a link, means connecting an opposite end portion of the third lever with a first end portion of said link, the link having an intermediate portion connected to the third portion of the second lever, governor means responsive to turbine speed, means connecting the speed governor to an intermediate portion of the first lever to effect translation thereof and position the first, second and third valves upon a preselected increase in turbine speed above the normal value maintained by said extraneous means, said last-mentioned connecting means including a fourth pivoted lever and a lost motion connection between the governor and fourth lever, a fifth floating lever, means connecting an end portion of the fifth lever with a second end portion of said link, means connecting an opposite end portion of the fifth lever with said first connecting means, and adjustable means connecting an intermediate portion of the fifth with the fourth lever.

LAWRENCE B. WALES.

REFERENCES CITED

The following references are of record in the file of this patent:

UNITED STATES PATENTS

| Number | Name | Date |
| --- | --- | --- |
| 2,111,420 | Ericson et al. | Mar. 15, 1938 |